(12) United States Patent
Mente et al.

(10) Patent No.: US 6,458,238 B1
(45) Date of Patent: Oct. 1, 2002

(54) ADHESIVE BINDER AND SYNERGIST COMPOSITION AND PROCESS OF MAKING LIGNOCELLULOSIC ARTICLES

(75) Inventors: Donald C. Mente, Grosse Ile; Li-Mei Lu, Canton, both of MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/751,137

(22) Filed: Dec. 29, 2000

(51) Int. Cl.$^7$ .............................. B32B 21/02; B27N 1/02; B27N 3/02
(52) U.S. Cl. .................. 156/331.4; 156/62.2; 156/296; 156/331.7; 264/109; 264/136
(58) Field of Search ................ 156/62.2, 296, 156/331.4, 331.7; 364/109, 136

(56) References Cited

U.S. PATENT DOCUMENTS

| | | |
|---|---|---|
| 3,870,665 A | 3/1975 | Diehr et al. |
| 3,919,279 A | 11/1975 | Rosenthal et al. |
| 3,962,302 A | 6/1976 | Rosenthal et al. |
| 4,100,328 A | 7/1978 | Gallagher ............... 428/407 |
| 4,257,995 A | 3/1981 | McLaughlin et al. ....... 264/122 |
| 4,257,996 A | 3/1981 | Farrissey, Jr. et al. ...... 264/122 |
| 4,320,208 A * | 3/1982 | Reischl et al. ............ 521/102 |
| 4,344,798 A | 8/1982 | Gaul et al. ............ 106/123 LC |
| 4,373,083 A | 2/1983 | Seiner et al. |
| 4,407,771 A | 10/1983 | Betzner et al. |
| 4,433,120 A * | 2/1984 | Chiu ....................... 525/501 |
| 4,490,517 A | 12/1984 | Fuzesi et al. .............. 527/401 |
| 4,742,144 A | 5/1988 | Nguyen et al. ............ 528/26.5 |
| 4,822,850 A | 4/1989 | Yashuda et al. |
| 4,983,338 A | 1/1991 | Schucker ................ 264/45.1 |
| 4,999,390 A * | 3/1991 | Bentsen ................... 524/30 |
| 5,002,713 A | 3/1991 | Palardy et al. |
| 5,096,945 A | 3/1992 | Sun |
| 5,120,812 A | 6/1992 | O'Lenick, Jr. et al. ....... 528/28 |
| 5,151,238 A * | 9/1992 | Earl et al. ................ 264/136 |
| 5,200,267 A | 4/1993 | Bauer et al. |
| 5,283,311 A | 2/1994 | Narayan et al. ............ 528/49 |
| 5,554,438 A | 9/1996 | Marcinko et al. ........ 428/306.6 |
| 5,574,122 A | 11/1996 | Yeske et al. |
| 5,637,639 A * | 6/1997 | Duan et al. ............... 524/591 |
| 5,660,763 A | 8/1997 | Uhlig |
| 5,977,398 A | 11/1999 | Komiya |
| 6,086,998 A | 7/2000 | Wihsmann et al. |

FOREIGN PATENT DOCUMENTS

| | | |
|---|---|---|
| EP | 0129430 | 12/1984 |
| WO | WO 9814425 | 4/1998 |
| WO | WO 9904943 | 2/1999 |

\* cited by examiner

*Primary Examiner*—Sam Chaun Cua Yao
(74) *Attorney, Agent, or Firm*—Fernando Borrego

(57) ABSTRACT

A method is disclosed for preparing compression molded or pressed lignocellulosic articles. The method involves forming a binder resin by combining a polyisocyanate component with a synergist component of a $C_1$ to $C_4$ N-alkyl pyrrolidone, gamma-butyrolactone, or mixtures thereof. A resinated lignocellulosic mixture is formed by combining the binder resin with lignocellulosic particles having a moisture content of from 2 to 15 weight percent. The compression molded or pressed lignocellulosic article is formed by compressing the resinated lignocellulosic mixture.

22 Claims, No Drawings

ADHESIVE BINDER AND SYNERGIST COMPOSITION AND PROCESS OF MAKING LIGNOCELLULOSIC ARTICLES

FIELD OF THE INVENTION

The present invention relates to a method for making compression molded or pressed lignocellulosic articles and, more specifically, a method for making compression molded or pressed boards using a binder resin comprising a polyisocyanate component and a synergist component.

BACKGROUND OF THE INVENTION

It is known to make compression molded or pressed lignocellulosic articles, such as particle board, Medium Density Fiberboard (MDF), agriboard (such as straw board, bagasse, etc.), and oriented strand board, by coating or contacting lignocellulosic particles with a binder resin to form a lignocellulosic mixture, optionally adding other additives including release agents or wood preservatives and compressing the mixture at elevated temperatures and pressures for a time sufficient to make commercially useful articles, such as, boards and panels.

The lignocellulosic particles can be in the form of chips, shavings, strands, wafers, fibers, sawdust, straw, and wood wool. When the particles are relatively larger in size, the boards produced by the process are known in the art under the general term of engineered wood. These engineered woods include laminated strand lumber, oriented strand board, parallel strand lumber, and laminated veneer lumber. When the lignocellulosic particles are relatively smaller, the boards are known in the art as particleboard and fiber board.

The engineered wood products were developed because of the increasing scarcity of suitably sized tree trunks for cutting lumber. Such products can have advantageous physical properties such as strength and stability. Another advantage of the engineered wood and particle boards and panels is that they can be made from the waste material generated by processing other wood and lignocellulosic materials. This leads to efficiencies and energy savings from the recycling process, and saves landfill space.

The binder used to make the lignocellulosic articles is typically a resinous material. One common class of binders are resins produced by polymerizing formaldehyde with other resin forming monomers, including urea, melamine, and phenol. In certain applications, articles made with such binders are deficient in some properties such as water resistance.

Another class of binders are the organic diisocyanate or polyisocyanate binders. One of the advantages of this class is its superior resistance to water. A disadvantage of the typical isocyanate binders is their relatively high viscosity, which can lead to problems with delivery of the binder onto the particles, and with wet out of the binder onto the particles. This high viscosity also requires that excess binder be used to fully coat the particles. Also these binders tend to ooze out of the particles during compression and are deposited on parts of the mold leading to further processing difficulties.

In the past various solvents have been added to the polyisocyanate binder compositions with the aim of achieving a lower viscosity and better handling properties. After application, the solvent generally evaporates during the molding process, leaving the bound particles behind. One major disadvantage of prior art solvents is that they cause a reduction in the physical properties of the formed board including a reduction in the internal bond strength of the formed board.

For example, it is known to use dialkyl carbonate solvents in isocyanate binder compositions for coating lignocellulosic particles prior to compression at high temperature and pressure to make manufactured lignocellulosic articles.

However, the use of these solvent systems do not lower the amount of isocyanate binder composition required for achieving best results, also the solvent systems generally lower the physical properties of the produced board.

It would therefore be advantageous to provide a synergist for a polyisocyanate binder resin, which will not only lower the viscosity of the binder resin but will also increase or maintain the efficiency of the binder resin when it is used to form lignocellulosic articles.

SUMMARY OF THE INVENTION

One embodiment of the present invention is a method for preparing a compression molded or pressed lignocellulosic article comprises the steps of: forming a binder resin by combining from about 75 to 99.5 weight percent based on the total weight of the binder resin of a polyisocyanate component with from about 25 to 0.5 weight percent based on the total weight of the binder resin of a synergist component selected from the group consisting of a $C_1$ to $C_4$ N-alkyl pyrrolidone, gamma-butyrolactone, and mixtures thereof; forming a resinated lignocellulosic mixture by combining from about 1 to 10 weight percent based on the total weight of the lignocellulosic mixture of the binder resin with from about 99 to 90 weight percent based on the total weight of the lignocellulosic mixture of lignocellulosic particles, the lignocellulosic particles having a moisture content of from 2 to 15 weight percent; and forming a compression molded or pressed lignocellulosic article by compressing the resinated lignocellulosic mixture.

In another embodiment, a method for preparing a compression molded or pressed lignocellulosic article comprises the steps of: forming a binder resin by combining from about 75 to 99.5 weight percent based on the total weight of the binder resin of a polyisocyanate component selected from the group consisting of diphenylmethane-2,2'-diisocyanate, diphenylmethane-2,4'-diisocyanate, diphenylmethane-4,4'-diisocyanate, polymeric diphenylmethane-diisocyanate, and mixtures thereof with from about 25 to 0.5 weight percent based on the total weight of the binder resin of a synergist component selected from the group consisting of a $C_1$ to $C_4$ N-alkyl pyrrolidone, gamma-butyrolactone, and mixtures thereof; forming a resinated lignocellulosic mixture by combining from about 1 to 10 weight percent based on the total weight of the lignocellulosic mixture of the binder resin with from about 99 to 90 weight percent based on the total weight of the lignocellulosic mixture of lignocellulosic particles, the lignocellulosic particles having a moisture content of from 2 to 15 weight percent; and forming a compression molded or pressed lignocellulosic article by compressing the resinated lignocellulosic mixture.

DETAILED DESCRIPTION OF A PREFERRED EMBODIMENT OF THE INVENTION

In accordance with the present invention there is disclosed a method that utilizes a polyisocyanate binder resin for the preparation of compression molded or pressed lignocellulosic articles. The binder resin comprises a polyisocyanate component and a synergist component selected from the group consisting of a $C_1$–$C_4$ N-alkyl pyrrolidone, gamma-butyrolactone, and mixtures thereof. Throughout the present specification and claims the terms compression molded or pressed are intended to refer to the same process whereby the article is formed by either compression molding the article in a mold or by using compression as between a pair of plates from a press. In both procedures pressure and heat are used to form the article and to set the binder.

In the present specification and claims the term polyisocyanate component is intended to include a single polyisocyanate and mixtures of polyisocyanates. The polyisocyanate component which may be used includes aliphatic, alicyclic and aromatic polyisocyanates characterized by containing two or more isocyanate groups. Such polyisocyanates include the diisocyanates and higher functionality isocyanates, particularly the aromatic polyisocyanates. Mixtures of polyisocyanates may also be used and include, crude mixtures of di- and higher functionality polyisocyanates produced by phosgenation of aniline-formaldehyde condensates or as prepared by the thermal decomposition of the corresponding carbamates dissolved in a suitable solvent, as described in U.S. Pat. Nos. 3,962,302 and 3,919,279, the disclosures of which are incorporated herein by reference, both known as crude diphenylmethane diisocyanate (MDI) or polymeric MDI. The organic polyisocyanate may be an isocyanate-terminated prepolymer prepared by reacting, an excess of a polyisocyanate with a polyol which, on a polyisocyanate to polyol basis, may range from about 20:1 to 2:1. The polyols include, for example, polyethylene glycol, polypropylene glycol, diethylene glycol monobutyl ether, ethylene glycol monoethyl ether, triethylene glycol, etc., as well as glycols or polyglycols partially esterified with carboxylic acids including polyester polyols, and polyether polyalkylene polyols.

The organic polyisocyanates or isocyanate-terminated prepolymer may also be used in the form of an aqueous emulsion by mixing such materials with water in the presence of an emulsifying agent. The isocyanates may also contain impurities or additives such as carbodiimides, isocyanurate groups, urea, hydrolyzable chlorides and biurets. Illustrative of such di- or polyisocyanates which may be employed include, for example: toluene-2,4- and 2,6-diisocyanates or mixtures thereof, diphenylmethane-4,4'-diisocyanate and diphenylmethane-2,4'-diisocyanate or mixtures of same, the mixtures preferably containing about 10 parts by weight 2,4'-or higher, making them liquid at room temperature; polymethylene polyphenyl isocyanates; naphthalene-1,5-diisocyanate; 3,3'-dimethyl diphenylmethane-4,4'-diisocyanate; triphenyl-methane triisocyanate; hexamethylene diisocyanate; 3,3'-ditolylene-4,4-diisocyanate; butylene 1,4-diisocyanate; octylene-1,8-diisocyanate; 4-chloro-1,3-phenylene diisocyanate; 1,4-, 1,3-, and 1,2-cyclohexylene diisocyanates and; in general, the polyisocyanates disclosed in U.S. Pat. No. 3,577,358, the disclosure of which is incorporated herein by reference. Preferred polyisocyanates include 2,4'-MDI, 4,4'-MDI, 2,2'-MDI, polymeric MDI, and mixtures thereof.

Typical of the suitable polyisocyanates are those sold under the trademark Lupranate® by BASF Corporation. For example, Lupranate® MI, an isomeric blend of 2,4' and 4,4' MDI isomers, or Lupranate® M20 SB, a polymeric MDI.

The synergist component useful in the resin binders of the invention includes lower N-alkyl pyrrolidones. In general, the $C_1$–$C_4$ N-alkylpyrrolidones are useful in the invention, with the preferred N-alkyl pyrrolidone being N-methyl-2-pyrrolidone. Other useful synergists include gamma-butyrolactone. Mixtures of the above synergists can also be used to form the synergist component.

The resin binder of the present invention can also contain other solvents, so long as the physical properties of the resulting lignocellulosic article are not adversely affected. For example, it is preferred to avoid xylene as a component of the resin binder, because the use of xylene leads to a lower internal bond strength in the resulting lignocellulosic article.

The binder resin can also contain other conventional additives, such as internal mold release agents, fire retardants or wood preservatives. When the binder resin includes such optional additives, efficiency is gained because the binder resin and any other necessary ingredients can be coated onto the lignocellulosic particles in a single step.

The synergist component can be combined with the polyisocyanate component in an amount of from 0.5 to 25 weight percent based on the total weight of the binder resin. More preferably, the binder resin includes from about 0.5 to 15 weight percent, and most preferably from about 0.5 to 10 weight percent synergist based on the total weight of the binder resin. The binder resin preferably comprises from about 75 to 99.5 weight percent based on the total weight of the binder resin of the polyisocyanate, and more preferably from about 85 to 99 weight percent polyisocyanate.

The lignocellulosic particles can be derived from a variety of sources. They can come from wood and from other products such as bagasse, straw, flax residue, nut shells, cereal grain hulls, and mixtures thereof. Non-lignocellulosic materials in flake, fibrous or other particulate form, such as glass fiber, mica, asbestos, rubber, plastics and the like, can be mixed with the lignocellulosic particles. The lignocellulosic particles can come from the process of comminuting small logs, industrial wood residue, branches, or rough pulpwood into particles in the form of sawdust, chips, flakes, wafer, strands, medium density fibers (MDF), and the like. They can be prepared from various species of hardwoods and softwoods. It is important that the lignocellulosic particles have a moisture content of from 2 to 15 weight percent. In a further preferred embodiment the water content is from 3 to 12 weight percent, and most preferably from 4 to 10 weight percent. The water is utilized during the curing of the binder resin. If the water content is outside of this range the binder resin is not as efficient at forming the molded article.

The lignocellulosic particles can be produced by various conventional techniques. For example, pulpwood grade logs can be converted into flakes in one operation with a conventional roundwood flaker. Alternatively, logs and logging residue can be cut into fingerlings on the order of about 0.5 to 3.5 inches long with a conventional apparatus, and the fingerlings flaked in a conventional ring type flaker. The logs are preferably debarked before flaking.

The dimensions of the lignocellulosic particles are not particularly critical. Flakes commonly have an average length of about 2 to 6 inches, and average width of about 0.25 to 3 inches, and an average thickness of about 0.005 to about 0.05 inches. Strands which are about 4 cm wide and 12 cm long can be used to make laminated strand lumber, while strands about 0.3 cm wide and 25 cm long can be used to make parallel strand lumber.

The wood particles can be further milled prior to use in the process of the invention, if such is desired to produce a size more suitable for producing the desired article. For example, hammer, wing beater, and toothed disk mills may be used.

The wood or lignocellulosic particles are resinated using the binder resin described above. The binder resin and the lignocellulosic particles are mixed or milled together during the formation of a resinated lignocellulosic mixture. Generally, the binder resin can be sprayed onto the particles while they are being agitated in suitable equipment. To maximize coverage of the particles, the binder resin is preferably applied by spraying droplets of the binder resin onto the particles as they are being tumbled in a rotary blender or similar apparatus. For example, the particles can be resinated in a rotary drum blender equipped with a spinning disk atomizer. One advantage of the present invention is that the binder resin forms smaller droplets than typical polyisocyanate binder resins leading to better coverage of the particles.

For testing on a lab scale, a simpler apparatus can suffice to resinate the particles. For example, a 5 gallon can is provided with baffles around the interior sides, and a lid with a hole large enough to receive the nozzle of a spray gun or other liquid delivery system, such as a pump sprayer. It is preferred that the binder resin be delivered as a spray. The particles to be resinated are placed in a small rotary blender. The blender is rotated to tumble the particles inside against the baffles, while the desired amount of binder resin is delivered with a spray device. After the desired amount of binder resin has been delivered, the particles can be tumbled for a further time to effect the desired mixing of the particles with the binder resin.

The amount of binder resin to be mixed with the wood or lignocellulosic particles in the resinating step is dependant upon several variables including, the binder resin used, the size, moisture content and type of particles used, the intended use of the product, and the desired properties of the product. Generally, the amount of binder resin to mix with the particles is from about 1 to 10 weight percent based on the total weight of the resinated lignocellulosic mixture. In a preferred embodiment the amount of binder resin is from 1 to 4 weight percent based on the total weight of the resinated lignocellulosic mixture.

The mixture produced during the resinating step is referred to in the art as a furnish. The resulting furnish, i.e., the mixture of particles, binder resin, and optionally, wax, wood preservatives and/or other additives, is formed into a single or multi-layered mat that is compressed into a particle board or flakeboard panel or another composite article of the desired shape and dimensions. The mat can be formed in any suitable manner. For example, the furnish can be deposited on a plate-like carriage carried on an endless belt or conveyor from one or more hoppers spaced above the belt. When a multi-layer mat is formed, a plurality of hoppers are used with each having a dispensing or forming head extending across the width of the carriage for successively depositing a separate layer of the furnish as the carriage is moved between the forming heads. The mat thickness will vary depending upon such factors as the size and shape of the particles, the particular technique used in forming the mat, the desired thickness and density of the final product and the pressure used during the press cycle. The mat thickness usually is about 5 to 20 times the final thickness of the article. For example, for flakeboard or particle board panels of ½ inch thickness and a final density of about 35 lbs/ft³, the mat usually will be about 3 to 6 inches thick. After mat formation, a paper overlay, like that used in furniture panels or for exterior siding, can be applied to the mat prior to pressing.

Press temperatures, pressures and times vary widely depending upon the shape, thickness and the desired density of the composite article, the size and type of particles, the moisture content of the particles, and the specific binder resin used. The press temperature can be from about 100° to 300° C. In order to minimize generation of internal steam and the reduction of the moisture content of the final product below a desired level, e.g., about 8 to about 12%, the press temperature preferably is less than about 250° C., and most preferably from about 180° to about 240° C. The pressure utilized is generally from about 300 to about 800 pounds per square inch. The press time utilized should be of sufficient duration to at least substantially cure the binder resin and to provide a composite article of the desired shape, dimension and strength. Preferably the press time is from 120 to 350 seconds. For the manufacture of flakeboard or particle board panels, the press time depends primarily upon the panel thickness of the article produced. The pressure applied by the press is correlated with the press temperature so that the moisture content of the final product is from about 8 to 12%. For example, the press time is generally from about 200 to about 300 seconds for a pressed article with a ½ inch thickness.

During the pressing process, it may be desirable to utilize additives which have release properties. As indicated above, release agents may be incorporated into the binder resin of the invention. Alternatively, external release agents may be applied directly to the compression surfaces prior to pressing.

Oriented Strand Board Manufacture

Oriented strand board (OSB) can be made by the process of the invention from a plurality of discrete generally oriented strands or strips of wood hot pressed together using a binder resin, such as the binder resin of the present invention described above. The pieces or strips of wood are, for example, plywood or veneer strips having a width of about ¼ inch to ⅜ inch, a length of about 2½ inches to about 3 inches and a thickness of about 20 mils. The strips of wood are generally oriented so that the fiber direction is approximately the same. The resinated, oriented strips are disposed into a press or mold so that the strips are in contact with other strips both vertically and horizontally so that when pressed under heat and pressure the strips are compressed tightly against other contacting strips to adhere the strips together and to mold a sheet of material having desired dimensions. The strands or strips of wood material are not perfectly aligned in one fiber direction (approximately ±20° from a single direction) so that some strips overlap other adjacent strips for stronger adhesion.

EXAMPLES

Oriented strand boards are prepared in a pilot plant according to the process described above. The strands are obtained from a commercial mill and are predominantly poplar. The strands are resinated in a rotary drum blender equipped with at least one single spinning disk atomizer using 2.5 weight percent of the binder resin. Such blenders are known in the art and are available from suppliers such as Coil Manufacturing, they typically include up to six spinning disk atomizers in each blender. The press cycle is a total of 4 minutes with a press temperature of about 205° C. A commercially available external release agent, a water based organosiloxane emulsion, is coated on the inner mold surfaces. The target size of the boards is 2 feet by 2 feet by ⁷⁄₁₆ inch, with a density of 39 pounds per cubic foot. A total of 24 boards are produced. Twelve of the boards are produced by a conventional process, wherein the resination step is accomplished with a binder resin containing only Lupranate® M20SB ("M20SB"), a polymeric MDI material sold by BASF Corporation. The other twelve are produced by the process of the current invention, wherein the binder resin contains 10 weight percent of N-methyl-2-pyrrolidone ("NMP") and 90 weight percent of Lupranate® M20 SB. Eight boards, four from each group of twelve, were randomly chosen for evaluation of average density and internal bond strength (IB). The results are given in Table 1.

In Table 1, the IB is given in units of pounds per square inch, or psi. Internal bond strength, is a commonly measured parameter of lignocellulosic articles manufactured by pressing binder coated wood particles at high temperature and pressure. It measures the effectiveness of the binder resin. The higher the IB, the stronger is the article of board made by the process. For Table 1, IB is measured according to ASTM D-1037.

TABLE 1

ORIENTED STRAND BOARDS

| Example | Binder Resin composition | Density, (lbs/ft$^3$) | IB (psi) |
|---|---|---|---|
| 1 | 100% M20SB | 38.7 | 51.8 |
| 2 | 100% M20SB | 39 | 56.1 |
| 3 | 100% M20SB | 38.1 | 39.0 |
| 4 | 100% M20SB | 40.4 | 45.5 |
| 5 | 90% M20SB + 10% NMP | 40.4 | 63.9 |
| 6 | 90% M20SB + 10% NMP | 39.9 | 55.3 |
| 7 | 90% M20SB + 10% NMP | 40.2 | 52.1 |
| 8 | 90% M20SB + 10% NMP | 39 | 51.6 |
| Average | 100% M20SB | 38.8 | 48.1 |
| Average | 90% M20SB + 10% NMP | 39.9 | 55.7 |

It is seen from Table 1 that boards made using a binder resin where 10% of the polymeric MDI is replaced by NMP are at least as strong, based on measurement of IB, as are boards made using a binder which is 100% MDI. In fact, the results suggest that the NMP enchances the strength of the formed internal bonds (average of 55.7 with 10% NMP versus 48.1 with no NMP). While not wishing to be bound by any particular theory it is believed that the NMP dissolves the lignin in the lignocellulosic material thereby enchancing the penetration of the binder resin and its adhesion to the lignocellulosic particles.

In another experiment boards are prepared as described above using several levels of NMP and the viscosity of the binder resin is measured in addition to IB. The results are presented below in Table 2.

TABLE 2

ORIENTED STRAND BOARDS

| Example | Binder resin composition | Viscosity at 25° (centipoise) | Density, (lbs/ft$^3$) | IB (psi) |
|---|---|---|---|---|
| 1 | 100% M20SB | 209 | 38.9 | 54 |
| 2 | 95% M20SB + 5% NMP | 130 | * | * |
| 3 | 90% M20SB + 10% NMP | 83 | 39.9 | 56 |

*not determined

The results demonstrate the significant reduction of viscosity provided by the present binder resin without a reduction in the internal bond strength that would be expected based on typical solvents.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method for preparing a compression molded or pressed lignocellulosic article comprising the steps of:
   a) forming a binder resin by combining from about 75 to 90 weight percent based on the total weight of the binder resin of a polyisocyanate component with from about 25 to 10 weight percent based on the total weight of the binder resin of a synergist component selected from the group consisting of a $C_1$ to $C_4$ N-alkyl pyrrolidone, gamma-butyrolactone, and mixtures thereof;
   b) forming a resinated lignocellulosic mixture by combining from about 1 to 10 weight percent based on the total weight of the lignocellulosic mixture of the binder resin with from about 99 to 90 weight percent based on the total weight of the lignocellulosic mixture of lignocellulosic particles, the lignocellulosic particles having a moisture content of from 2 to 15 weight percent; and
   c) forming a compression molded or pressed lignocellulosic article by compressing the resinated lignocellulosic mixture at an elevated temperature and under pressure.

2. The method as recited in claim 1, wherein the polyisocyanate component is selected from the group consisting of diphenylmethane-2,2'-diisocyanate, diphenylmethane-2,4'-diisocyanate, diphenylmethane-4,4'-diisocyanate, polymeric diphenylmethane-diisocyanate, and mixtures thereof.

3. The method as recited in claim 1, wherein step a) comprises forming the binder resin by combining the polyisocyanate component with N-methyl-2-pyrrolidone.

4. The method as recited in claim 1, wherein step b) comprises forming the resinated lignocellulosic mixture by combining the binder resin with the lignocellulosic particles in a rotary drum blender having at least one spinning disk atomizer for delivery of the binder resin to the lignocellulosic particles.

5. The method as recited in claim 1, wherein step b) comprises spraying the binder resin onto the lignocellulosic particles to form the lignocellulosic mixture.

6. The method as recited in claim 1, wherein step b) comprises forming the resinated lignocellulosic mixture by combining the binder resin with lignocellulosic particles having a moisture content of from 3 to 12 weight percent.

7. The method as recited in claim 1, wherein step b) comprises forming the resinated lignocellulosic mixture by combining the binder resin with lignocellulosic particles having a moisture content of from 4 to 10 weight percent.

8. The method as recited in claim 1, wherein step c) comprises compressing the resinated lignocellulosic mixture at an elevated temperature of from about 100 to 300° C.

9. The method as recited in claim 1, wherein step c) comprises compressing the resinated lignocellulosic mixture at an elevated temperature of from about 180 to 240° C.

10. The method as recited in claim 1, wherein step c) comprises compressing the resinated lignocellulosic mixture under a pressure of from about 300 to 800 pounds per square inch.

11. The method as recited in claim 1, wherein step c) comprises compressing the resinated lignocellulosic mixture for a period of time from about 120 to 350 seconds.

12. The method as recited in claim 1, wherein step c) comprises forming a compression molded or pressed lignocellulosic board.

13. A method for preparing a compression molded or pressed lignocellulosic article comprising the steps of:
   a) forming a binder resin by combining from about 75 to 90 weight percent based on the total weight of the binder resin of a polyisocyanate component selected from the group consisting of diphenylmethane-2,2'-diisocyanate, diphenylmethane-2,4'-diisocyanate, diphenylmethane-4,4'-diisocyanate, polymeric diphenylmethane-diisocyanate, and mixtures thereof with from about 25 to 10 weight percent based on the total weight of the binder resin of a synergist component selected from the group consisting of a $C_1$ to $C_4$ N-alkyl pyrrolidone, gamma-butyrolactone, and mixtures thereof;

b) forming a resinated lignocellulosic mixture by combining from about 1 to 10 weight percent based on the total weight of the lignocellulosic mixture of the binder resin with from about 99 to 90 weight percent based on the total weight of the lignocellulosic mixture of lignocellulosic particles, the lignocellulosic particles having a moisture content of from 10 to 15 weight percent; and c) forming a compression molded or pressed lignocellulosic article by compressing the resinated lignocellulosic mixture at an elevated temperature and under pressure.

14. The method as recited in claim 13, wherein step a) comprises forming the binder resin by combining the polyisocyanate component with N-methyl-2-pyrrolidone.

15. The method as recited in claim 13, wherein step b) comprises forming the resinated lignocellulosic mixture by combining the binder resin with the lignocellulosic particles in a rotary drum blender having at least one spinning disk atomizer for delivery of the binder resin to the lignocellulosic particles.

16. The method as recited in claim 13, wherein step b) comprises spraying the binder resin onto the lignocellulosic particles to form the lignocellulosic mixture.

17. The method as recited in claim 13, wherein step b) comprises forming the resinated lignocellulosic mixture by combining the binder resin with lignocellulosic particles having a moisture content of from 3 to 12 weight percent.

18. The method as recited in claim 13, wherein step b) comprises forming the resinated lignocellulosic mixture by combining the binder resin with lignocellulosic particles having a moisture content of from 4 to 10 weight percent.

19. The method as recited in claim 13, wherein step c) comprises compressing the resinated lignocellulosic mixture at an elevated temperature of from about 100 to 300° C.

20. The method as recited in claim 13, wherein step c) comprises compressing the resinated lignocellulosic mixture under a pressure of from about 300 to 800 pounds per square inch.

21. The method as recited in claim 13, wherein step c) comprises compressing the resinated lignocellulosic mixture for a period of time from about 120 to 350 seconds.

22. The method as recited in claim 13, wherein step c) comprises forming a compression molded or pressed lignocellulosic board.

* * * * *